(12) United States Patent
Agranov et al.

(10) Patent No.: US 9,686,485 B2
(45) Date of Patent: Jun. 20, 2017

(54) PIXEL BINNING IN AN IMAGE SENSOR

(71) Applicant: Apple Inc., Cupertino, CA (US)

(72) Inventors: Gennadiy A. Agranov, Cupertino, CA (US); Claus Molgaard, Cupertino, CA (US); Ashirwad Bahukhandi, Cupertino, CA (US); Chiajen Lee, Cupertino, CA (US); Xiangli Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,599

(22) Filed: May 30, 2014

(65) Prior Publication Data

US 2015/0350575 A1 Dec. 3, 2015

(51) Int. Cl.
| | |
|---|---|
| H04N 5/345 | (2011.01) |
| H04N 5/347 | (2011.01) |
| H04N 5/3745 | (2011.01) |
| H04N 9/04 | (2006.01) |

(52) U.S. Cl.
CPC ........... H04N 5/3458 (2013.01); H04N 5/347 (2013.01); H04N 5/37457 (2013.01); H04N 9/045 (2013.01)

(58) Field of Classification Search
CPC ......... H04N 5/335; H04N 9/045; H05N 5/347
See application file for complete search history.

(56) References Cited

U.S. PATENT DOCUMENTS

| | | | |
|---|---|---|---|
| 4,686,572 A | 8/1987 | Takatsu | |
| 4,686,648 A | 8/1987 | Fossum | |
| 5,105,264 A | 4/1992 | Erhardt et al. | |
| 5,329,313 A | 7/1994 | Keith | |
| 5,396,893 A | 3/1995 | Oberg et al. | |
| 5,471,515 A | 11/1995 | Fossum et al. | |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

Schwarzer, et al., On the determination of film stress from substrate bending: Stoney's formula and its limits, Jan. 2006, 19 pages.

(Continued)

*Primary Examiner* — Amy Hsu
(74) *Attorney, Agent, or Firm* — Brownstein Hyatt Farber Schreck, LLP

(57) ABSTRACT

Pixel binning is performed by summing charge from some pixels positioned diagonally in a pixel array. Pixel signals output from pixels positioned diagonally in the pixel array may be combined on the output lines. A signal representing summed charge produces a binned 2×1 cluster. A signal representing combined voltage signals produces a binned 2×1 cluster. A signal representing summed charge and a signal representing combined pixel signals can be combined digitally to produce a binned 2×2 pixel. Orthogonal binning may be performed on other pixels in the pixel array by summing charge on respective common sense regions and then then combining the voltage signals that represent the summed charge on respective output lines.

25 Claims, 11 Drawing Sheets

(56) References Cited

U.S. PATENT DOCUMENTS

| | | | |
|---|---|---|---|
| 5,541,402 | A | 7/1996 | Ackland |
| 5,550,677 | A | 8/1996 | Schofield et al. |
| 5,781,312 | A | 7/1998 | Noda |
| 5,841,126 | A | 11/1998 | Fossum et al. |
| 5,880,459 | A | 3/1999 | Pryor et al. |
| 5,949,483 | A | 9/1999 | Fossum et al. |
| 6,008,486 | A | 12/1999 | Stam et al. |
| 6,040,568 | A | 3/2000 | Caulfield et al. |
| 6,233,013 | B1 | 5/2001 | Hosier et al. |
| 6,348,929 | B1* | 2/2002 | Acharya ............ H04N 19/59 345/660 |
| 6,448,550 | B1 | 9/2002 | Nishimura |
| 6,528,833 | B2 | 3/2003 | Lee et al. |
| 6,541,751 | B1 | 4/2003 | Bidermann |
| 6,713,796 | B1 | 3/2004 | Fox |
| 6,714,239 | B2 | 3/2004 | Guidash |
| 6,798,453 | B1* | 9/2004 | Kaifu ............... H04N 3/1593 348/304 |
| 6,816,676 | B2 | 11/2004 | Bianchi et al. |
| 6,905,470 | B2 | 6/2005 | Lee et al. |
| 6,931,269 | B2 | 8/2005 | Terry |
| 6,956,605 | B1 | 10/2005 | Hashimoto |
| 6,982,759 | B2 | 1/2006 | Goto |
| 7,091,466 | B2 | 8/2006 | Bock |
| 7,119,322 | B2 | 10/2006 | Hong |
| 7,133,073 | B1 | 11/2006 | Neter |
| 7,259,413 | B2 | 8/2007 | Rhodes |
| 7,262,401 | B2 | 8/2007 | Hopper et al. |
| 7,271,835 | B2 | 9/2007 | Iizuka |
| 7,282,028 | B2 | 10/2007 | Kim et al. |
| 7,332,786 | B2 | 2/2008 | Altice |
| 7,390,687 | B2 | 6/2008 | Boettiger |
| 7,437,013 | B2 | 10/2008 | Anderson |
| 7,443,421 | B2 | 10/2008 | Stavely et al. |
| 7,502,054 | B2 | 3/2009 | Kalapathy |
| 7,525,168 | B2 | 4/2009 | Hsieh |
| 7,554,067 | B2 | 6/2009 | Zarnoski et al. |
| 7,555,158 | B2 | 6/2009 | Lee |
| 7,626,626 | B2 | 12/2009 | Panicacci |
| 7,671,435 | B2 | 3/2010 | Ahn |
| 7,714,292 | B2 | 5/2010 | Agarwal et al. |
| 7,728,351 | B2 | 6/2010 | Shim |
| 7,733,402 | B2 | 6/2010 | Egawa et al. |
| 7,742,090 | B2 | 6/2010 | Street |
| 7,764,312 | B2 | 7/2010 | Ono et al. |
| 7,773,138 | B2 | 8/2010 | Lahav et al. |
| 7,786,543 | B2 | 8/2010 | Hsieh |
| 7,796,171 | B2 | 9/2010 | Gardner |
| 7,873,236 | B2 | 1/2011 | Li et al. |
| 7,880,785 | B2 | 2/2011 | Gallagher |
| 7,884,402 | B2 | 2/2011 | Ki |
| 7,906,826 | B2 | 3/2011 | Martin et al. |
| 7,952,121 | B2 | 5/2011 | Arimoto |
| 7,952,635 | B2 | 5/2011 | Lauxtermann |
| 7,982,789 | B2 | 7/2011 | Watanabe et al. |
| 8,026,966 | B2 | 9/2011 | Altice |
| 8,032,206 | B1 | 10/2011 | Farazi et al. |
| 8,089,524 | B2 | 1/2012 | Urisaka |
| 8,094,232 | B2 | 1/2012 | Kusaka |
| 8,116,540 | B2 | 2/2012 | Dean |
| 8,140,143 | B2 | 3/2012 | Picard et al. |
| 8,153,947 | B2 | 4/2012 | Barbier et al. |
| 8,159,570 | B2 | 4/2012 | Negishi |
| 8,159,588 | B2 | 4/2012 | Boemler |
| 8,164,669 | B2 | 4/2012 | Compton et al. |
| 8,174,595 | B2* | 5/2012 | Honda ............... H04N 5/3458 348/294 |
| 8,184,188 | B2 | 5/2012 | Yaghmai |
| 8,194,148 | B2 | 6/2012 | Doida |
| 8,194,165 | B2 | 6/2012 | Border et al. |
| 8,227,844 | B2 | 7/2012 | Adkisson |
| 8,233,071 | B2 | 7/2012 | Takeda |
| 8,259,228 | B2 | 9/2012 | Wei et al. |
| 8,310,577 | B1 | 11/2012 | Neter |
| 8,324,553 | B2 | 12/2012 | Lee |
| 8,340,407 | B2 | 12/2012 | Kalman |
| 8,350,940 | B2 | 1/2013 | Smith et al. |
| 8,400,546 | B2 | 3/2013 | Itano et al. |
| 8,456,559 | B2 | 6/2013 | Yamashita |
| 8,508,637 | B2 | 8/2013 | Han et al. |
| 8,514,308 | B2 | 8/2013 | Itonaga et al. |
| 8,520,913 | B2 | 8/2013 | Dean |
| 8,547,388 | B2 | 10/2013 | Cheng |
| 8,575,531 | B2 | 11/2013 | Hynecek et al. |
| 8,581,992 | B2 | 11/2013 | Hamada |
| 8,594,170 | B2 | 11/2013 | Mombers et al. |
| 8,619,163 | B2 | 12/2013 | Ogua |
| 8,629,484 | B2 | 1/2014 | Ohri et al. |
| 8,634,002 | B2 | 1/2014 | Kita |
| 8,648,947 | B2 | 2/2014 | Sato et al. |
| 8,723,975 | B2 | 5/2014 | Solhusvik |
| 8,754,983 | B2 | 6/2014 | Sutton |
| 8,755,854 | B2 | 6/2014 | Addison et al. |
| 8,759,736 | B2 | 6/2014 | Yoo |
| 8,803,990 | B2 | 8/2014 | Smith |
| 8,817,154 | B2 | 8/2014 | Manabe et al. |
| 8,902,330 | B2 | 12/2014 | Theuwissen |
| 8,908,073 | B2 | 12/2014 | Minagawa |
| 8,934,030 | B2 | 1/2015 | Kim et al. |
| 8,936,552 | B2* | 1/2015 | Kateraas ............ A61B 5/02055 600/301 |
| 8,946,610 | B2 | 2/2015 | Iwabuchi et al. |
| 8,982,237 | B2 | 3/2015 | Chen |
| 9,054,009 | B2 | 6/2015 | Oike et al. |
| 9,066,017 | B2 | 6/2015 | Geiss |
| 9,066,660 | B2 | 6/2015 | Watson et al. |
| 9,088,727 | B2 | 7/2015 | Trumbo |
| 9,094,623 | B2 | 7/2015 | Kawaguchi |
| 9,099,604 | B2 | 8/2015 | Roy |
| 9,100,597 | B2 | 8/2015 | Hu |
| 9,131,171 | B2 | 9/2015 | Aoki et al. |
| 9,178,100 | B2 | 11/2015 | Webster et al. |
| 9,209,320 | B1 | 12/2015 | Webster |
| 9,232,150 | B2 | 1/2016 | Kleekajai et al. |
| 9,331,116 | B2 | 5/2016 | Webster |
| 9,467,553 | B2 | 10/2016 | Heo et al. |
| 9,497,397 | B1 | 11/2016 | Kleekajai et al. |
| 9,549,099 | B2 | 1/2017 | Fan |
| 9,584,743 | B1 | 2/2017 | Lin et al. |
| 9,596,423 | B1 | 3/2017 | Molgaard |
| 2001/0026321 | A1* | 10/2001 | Goto ............... H04N 3/1562 348/302 |
| 2003/0036685 | A1 | 2/2003 | Goodman et al. |
| 2004/0207836 | A1 | 10/2004 | Chhibber et al. |
| 2005/0026332 | A1 | 2/2005 | Fratti et al. |
| 2006/0274161 | A1 | 12/2006 | Ing et al. |
| 2007/0040100 | A1* | 2/2007 | Zarnowski ........ H01L 27/14603 250/208.1 |
| 2007/0263099 | A1 | 11/2007 | Motta et al. |
| 2008/0177162 | A1 | 7/2008 | Bae et al. |
| 2008/0315198 | A1 | 12/2008 | Jung |
| 2009/0096901 | A1 | 4/2009 | Bae et al. |
| 2009/0101914 | A1 | 4/2009 | Hirotsu et al. |
| 2009/0146234 | A1 | 6/2009 | Luo et al. |
| 2009/0147133 | A1* | 6/2009 | Wei ............... H04N 7/012 348/452 |
| 2009/0201400 | A1 | 8/2009 | Zhang et al. |
| 2010/0134631 | A1 | 6/2010 | Voth |
| 2010/0200729 | A1* | 8/2010 | Lee ............... H04N 5/37457 250/208.1 |
| 2010/0309351 | A1* | 12/2010 | Smith ............... H04N 5/335 348/280 |
| 2011/0075010 | A1* | 3/2011 | Border ............... H04N 5/347 348/317 |
| 2011/0080500 | A1 | 4/2011 | Wang et al. |
| 2011/0156197 | A1 | 6/2011 | Tivarus et al. |
| 2011/0205415 | A1 | 8/2011 | Makino et al. |
| 2011/0245690 | A1 | 10/2011 | Watson et al. |
| 2012/0026371 | A1* | 2/2012 | Itano ............... H04N 3/1568 348/301 |
| 2012/0092541 | A1 | 4/2012 | Tuulos et al. |
| 2012/0098964 | A1 | 4/2012 | Oggier et al. |
| 2012/0147207 | A1 | 6/2012 | Itonaga |

(56) References Cited

U.S. PATENT DOCUMENTS

| | | | |
|---|---|---|---|
| 2012/0153125 | A1 | 6/2012 | Oike et al. |
| 2013/0147981 | A1 | 6/2013 | Wu |
| 2013/0155271 | A1 | 6/2013 | Ishii |
| 2013/0222584 | A1 | 8/2013 | Aoki et al. |
| 2014/0004644 | A1 | 1/2014 | Roy |
| 2014/0049683 | A1 | 2/2014 | Guenter |
| 2014/0071321 | A1 | 3/2014 | Seyama |
| 2014/0240550 | A1 | 8/2014 | Taniguchi |
| 2014/0246568 | A1 | 9/2014 | Wan |
| 2014/0247378 | A1 | 9/2014 | Sharma et al. |
| 2014/0252201 | A1 | 9/2014 | Li et al. |
| 2014/0253754 | A1 | 9/2014 | Papiashvili |
| 2014/0253768 | A1 | 9/2014 | Li |
| 2014/0263951 | A1 | 9/2014 | Fan et al. |
| 2014/0267855 | A1 | 9/2014 | Fan |
| 2014/0347533 | A1 | 11/2014 | Toyoda |
| 2014/0354861 | A1* | 12/2014 | Pang ............. H04N 9/045 348/242 |
| 2015/0163392 | A1 | 6/2015 | Malone et al. |
| 2015/0163422 | A1 | 6/2015 | Fan et al. |
| 2015/0237314 | A1* | 8/2015 | Hasegawa ........ G06T 3/4007 348/279 |
| 2015/0264241 | A1 | 9/2015 | Kleekajai et al. |
| 2015/0264278 | A1 | 9/2015 | Kleekajai et al. |
| 2015/0312479 | A1 | 10/2015 | McMahon et al. |
| 2016/0050379 | A1 | 2/2016 | Jiang et al. |
| 2016/0099371 | A1 | 4/2016 | Webster |
| 2016/0365380 | A1 | 12/2016 | Wan |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | S61123287 | 6/1986 |
| JP | 2000059697 | 2/2000 |
| JP | 2001211455 | 8/2001 |
| JP | 2008507908 | 3/2008 |
| JP | 201149697 | 3/2011 |
| JP | 2012019516 | 1/2012 |
| JP | 2012513160 | 6/2012 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2006/014641 | 2/2006 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

Elgendi, "On the Analysis of Fingertip Photoplethysmogram Signals," *Current Cardiology Reviews,* 2012, vol. 8, pp. 14-25.

Fu, et al., "Heart Rate Extraction from Photoplethysmogram Waveform Using Wavelet Multui-resolution Analysis," *Journal of Medical and Biological Engineering,* 2008, vol. 28, No. 4, pp. 229-232.

Han, et al., "Artifacts in wearable photoplethysmographs during daily life motions and their reduction with least mean square based active noise cancellation method," *Computers in Biology and Medicine,* 2012, vol. 42, pp. 387-393.

Lopez-Silva, et al., "Heuristic Algorithm for Photoplethysmographic Heart Rate Tracking During Maximal Exercise Test," *Journal of Medical and Biological Engineering,* 2011, vol. 12, No. 3, pp. 181-188.

Santos, et al., "Accelerometer-assisted PPG Measurement During Physical Exercise Using the LAVIMO Sensor System," *Acta Polytechnica,* 2012, vol. 52, No. 5, pp. 80-85.

Sarkar, et al., "Fingertip Pulse Wave (PPG signal) Analysis and Heart Rate Detection," *International Journal of Emerging Technology and Advanced Engineering,* 2012, vol. 2, No. 9, pp. 404-407.

Yan, et al., "Reduction of motion artifact in pulse oximetry by smoothed pseudo Wigner-Ville distribution," *Journal of NeuroEngineering and Rehabilitation,* 2005, vol. 2, No. 3, pp. 1-9.

Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

Feng, et al., "On the Stoney Formula for a Thin Film/Substrate System with Nonuniform Substrate Thickness," Journal of Applied Mechanics, Transactions of the ASME, vol. 74, Nov. 2007, pp. 1276-1281.

Schwarzer, et al., On the determination of film stress from substrate bending: Stoney's formula and its limits, Jan. 2006, 17 pages.

U.S. Appl. No. 14/462,032, filed Aug. 18, 2014, Jiang et al.
U.S. Appl. No. 13/782,532, filed Mar. 1, 2013, Sharma et al.
U.S. Appl. No. 13/783,536, filed Mar. 4, 2013, Wan.
U.S. Appl. No. 13/785,070, filed Mar. 5, 2013, Li.
U.S. Appl. No. 13/787,094, filed Mar. 6, 2013, Li et al.
U.S. Appl. No. 13/797,851, filed Mar. 12, 2013, Li.
U.S. Appl. No. 13/830,748, filed Mar. 14, 2013, Fan.
U.S. Appl. No. 14/098,504, filed Dec. 5, 2013, Fan et al.
U.S. Appl. No. 14/207,150, filed Mar. 12, 2014, Kleekajai et al.
U.S. Appl. No. 14/207,176, filed Mar. 12, 2014, Kleekajai et al.
U.S. Appl. No. 14/276,728, filed May 13, 2014, McMahon et al.
U.S. Appl. No. 14/481,806, filed Sep. 9, 2014, Kleekajai et al.
U.S. Appl. No. 14/481,820, filed Sep. 9, 2014, Lin et al.
U.S. Appl. No. 14/501,429, filed Sep. 30, 2014, Malone et al.
U.S. Appl. No. 14/503,322, filed Sep. 30, 2014, Molgaard.
U.S. Appl. No. 14/569,346, filed Dec. 12, 2014, Kestelli et al.
U.S. Appl. No. 14/611,917, filed Feb. 2, 2015, Lee et al.

Aoki et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.

Evaluation Report dated Jan. 4, 2016, CN 2015203642039, 11 pages.

Office Action dated Mar. 16, 2016, KR 1020150075284, 9 pages.

* cited by examiner

|   | 1 | 2 | 3 | 4 | 5 | 6 | 7 | 8 |
|---|---|---|---|---|---|---|---|---|
| 1 | A | B | A | B | A | B | A | B |
| 2 | C | D | C | D | C | D | C | D |
| 3 | A | B | A | B | A | B | A | B |
| 4 | C | D | C | D | C | D | C | D |
| 5 | A | B | A | B | A | B | A | B |
| 6 | C | D | C | D | C | D | C | D |
| 7 | A | B | A | B | A | B | A | B |
| 8 | C | D | C | D | C | D | C | D |

FIG. 1

PIXEL BINNING IN AN IMAGE SENSOR

TECHNICAL FIELD

The present invention relates generally to electronic devices, and more specifically, to image sensors for electronic devices.

BACKGROUND

Cameras and other imaging devices often use one or more image sensors, such as a charge-coupled device (CCD) image sensor or a complementary metal-oxide-semiconductor (CMOS) image sensor to capture an image. In certain situations, the charge or signals produced by multiple pixels are binned or combined into a single signal. For example, pixel binning can be used when the output image resolution of a camera is less than the resolution of the image sensor in the camera, or to increase the sensitivity when an image is captured at low light levels. Pixel binning can be performed in the pixel array or after the signals are read out of the pixel array. Summing the pixels after the pixels have been read out of the pixel array does not increase the readout time since all of the pixels still have to be read out. Additionally, noise produced by the readout circuitry is summed with the pixel signals. The additional noise decreases the signal to noise ratio, which can degrade image quality.

Summing pixels in the pixel array can reduce the readout time since fewer pixels are read out of the pixel array. Generally, summing pixels in the pixel array is performed in orthogonal directions. FIG. 1 illustrates orthogonal summing with pixels in an image sensor with a Bayer color filter arrangement. The pixels are identified generically with the letters A, B, C, and D. In orthogonal binning, neighboring pixels in each color plane are binned together forming orthogonal clusters of 2×1 or 2×2 pixels. FIG. 1 depicts four clusters of 2×2 pixels. Four A pixels are summed together in cluster 100, four B pixels in cluster 102, four C pixels in cluster 104, and four D pixels are summed together in cluster 106. However, when the clusters are summed orthogonally, the clusters are out of alignment with respect to each other. This misalignment can produce spatial color artifacts in an image, which in turn reduces image quality.

SUMMARY

Embodiments described herein provide an imaging system and binning techniques that can improve image quality and spatial resolution of the binned image, which may enable a low power mode of operation, higher sensitivity, and increased frame rate of imaging system. In one aspect, an image sensor can include multiple pixels in a pixel array. A method for binning charge in the image sensor can include producing a first diagonal summed signal by summing charge in two or more pixels positioned along a first diagonal direction and reading the summed charge out of the pixel array, and producing a second diagonal summed signal by averaging signals from two or more pixels positioned along the first diagonal direction. The first and second diagonal summed signals can be converted to digital signals and combined digitally. The charge in the two or more pixels can be associated with a single color plane or with different color planes. Similarly, the signals that are averaged can be associated with a single color plane or with different color planes. For example, the different color planes may be the first green color plane and the second green color plane in a Bayer color filter array.

In another aspect, orthogonal binning may be performed by summing charge in pixels positioned along a first orthogonal direction to produce signals representing the summed charge, averaging two or more signals that represent the summed charge, and reading the averaged signals out of the pixel array.

In another aspect, an image capture device can include pixels divided into groups of pixels with each group of pixels operably connected to a distinct sense region and readout circuitry operably connected to each sense region and to a distinct output line. A first switch may be operably connected to a first set of output lines and to a second set of output lines. A processing device can be operably connected to the pixels. The processing device may be adapted to selectively enable two or more pixels in a group to sum charge on a respective sense region and to enable the respective readout circuitry to read the summed charge out of the sense regions. The processing device can be adapted to selectively enable two or more pixels in two groups to transfer charge to a respective sense region, to enable the respective readout circuitry to read the charge out of the respective sense regions to produce voltage signals, and to selectively enable the switch to connect an output line in the first set of output lines and an output line in the second set of output lines together to combine the voltage signals.

In another aspect, an image sensor can include multiple pixels in a pixel array. A method for binning charge in the image sensor can include producing a first diagonal summed signal by summing charge in a first diagonally adjacent pixel pair and reading the summed charge out of the pixel array, and producing a second diagonal summed signal by combining voltage signals output from a second diagonally adjacent pixel pair and reading the combined voltage signal out of the pixel array, wherein the first and second diagonally adjacent pixel pairs are diagonally adjacent along a first diagonal direction in the pixel array. The charge in the first diagonally adjacent pixel pair and the voltage signals in the second diagonally adjacent pixel pair can be associated with a single color plane or with different color planes. The first and second diagonal summed signals may be converted into digital first and second diagonal summed signals and combined digitally. Orthogonal binning can be performed by summing charge in a first pixel pair in a first orthogonal direction to produce a first voltage signal and summing charge in in a second pixel pair in a second orthogonal direction to produce a second voltage signal. The first and second voltage signals may be combined on an output line formed by electrically connecting two output lines together.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

Figure 1:
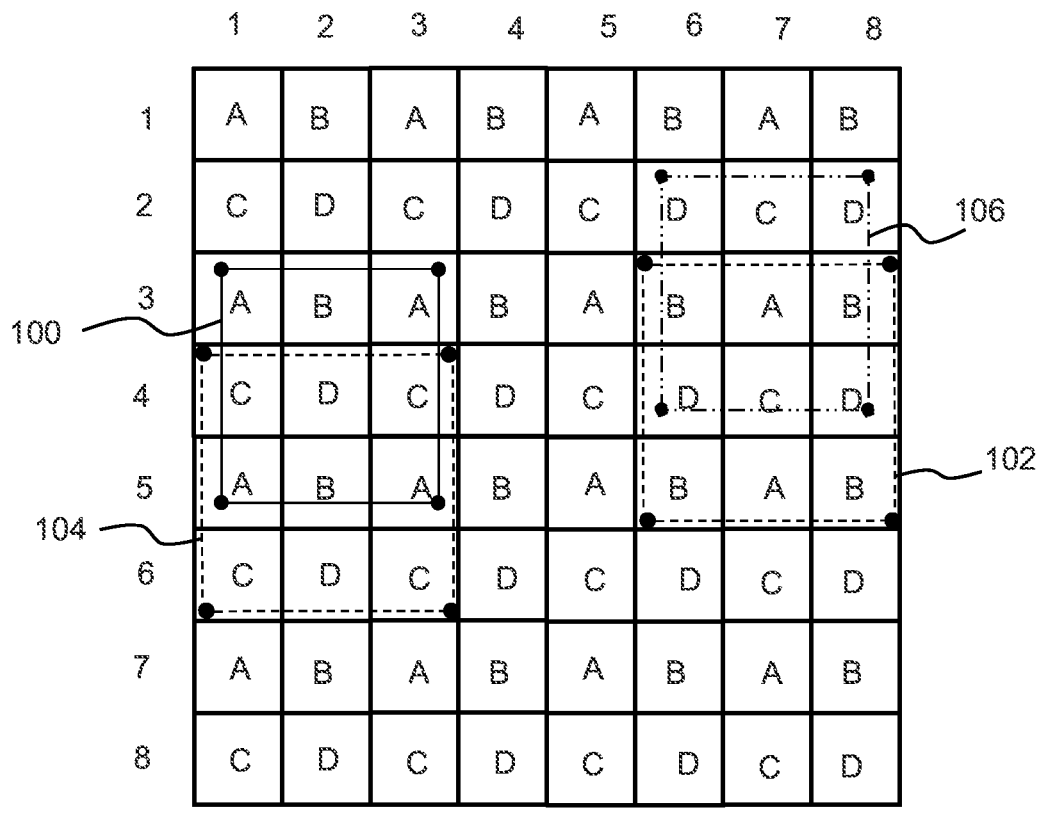

FIG. 1 depicts orthogonal summing with pixels in an image sensor;

DETAILED DESCRIPTION

Embodiments described herein describe various binning operations. Pixel binning can be performed by summing charge from some pixels positioned diagonally in a pixel array. Pixel voltage signals output from pixels positioned diagonally in the pixel array can be combined on the output lines. A signal representing summed charge produces a binned 2×1 cluster. A signal representing combined pixel signals produces a binned 2×1 cluster. A signal representing summed charge and a signal representing combined voltage signals can be combined digitally to produce a binned 2×2 pixel. Orthogonal binning may be performed on other pixels in the pixel array by summing charge on respective common sense regions and then combining the voltage signals that represent the summed charge on respective output lines.

Figures 2A, 2B:
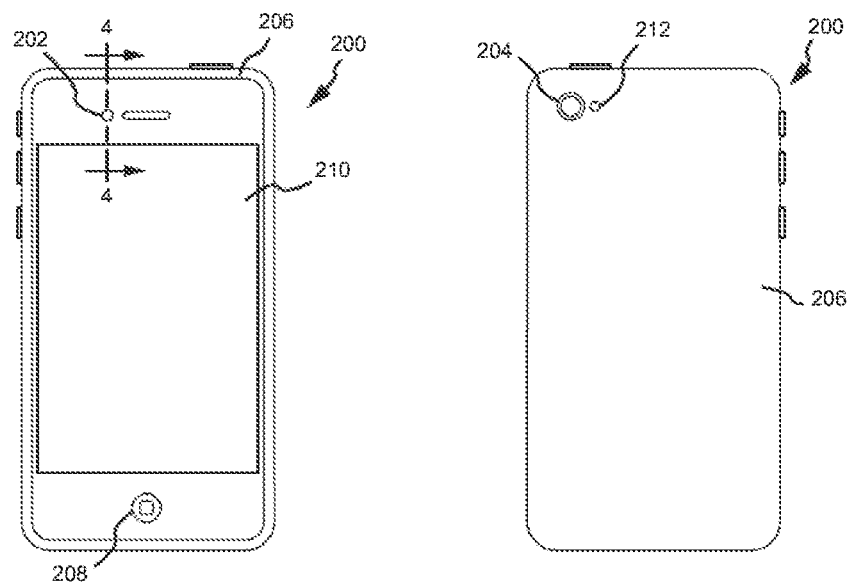
FIG. 2A illustrates a front perspective view of an electronic device including one or more cameras.
FIG. 2B depicts a rear perspective view of the electronic device of FIG. 2A.

Referring now to FIGS. 2A-2B, there are shown front and rear perspective views of an electronic device that includes one or more cameras in an embodiment. The electronic device 200 includes a first camera 202, a second camera 204, an enclosure 206, a display 210, an input/output (I/O) device 208, and an optional flash 212 or light source for the camera or cameras. The electronic device 200 can also include one or more internal components (not shown) typical of a computing or electronic device, such as, for example, one or more processors, memory components, network interfaces, and so on.

In the illustrated embodiment, the electronic device 200 is implemented as a smart telephone. Other embodiments, however, are not limited to this construction. Other types of computing or electronic devices can include one or more cameras, including, but not limited to, a netbook or laptop computer, a tablet computing device, a digital camera, a wearable electronic or communication device, a scanner, a video recorder, and a copier.

As shown in FIGS. 2A-2B, the enclosure 206 can form an outer surface or partial outer surface and protective case for the internal components of the electronic device 200, and may at least partially surround the display 210. The enclosure 206 can be formed of one or more components operably connected together, such as a front piece and a back piece. Alternatively, the enclosure 206 can be formed of a single piece operably connected to the display 210.

The I/O device 208 can be implemented with any type of input or output device. By way of example only, the I/O device 208 can be a switch, a button, a capacitive sensor, or other input mechanism. The I/O device 208 allows a user to interact with the electronic device 200. For example, the I/O device 208 may be a button or switch to alter the volume, return to a home screen, and the like. The electronic device can include one or more input device and/or output devices, and each device can have a single I/O function or multiple I/O functions. Examples include microphone, speakers, touch sensor, network or communication ports, and wireless communication devices. In some embodiments, one or more touch sensors can be included in the I/O device 208 and/or in the display 210.

The display 210 can be operably or communicatively connected to the electronic device 200. The display 210 can be implemented with any type of suitable display, such as a retina display, a color liquid crystal display (LCD), or an organic light-emitting display (OLED). The display 210 can provide a visual output for the electronic device 200 or function to receive user inputs to the electronic device. For example, the display 210 can be a multi-touch capacitive sensing touchscreen that can detect one or more user touch and/or force inputs.

Figure 3:
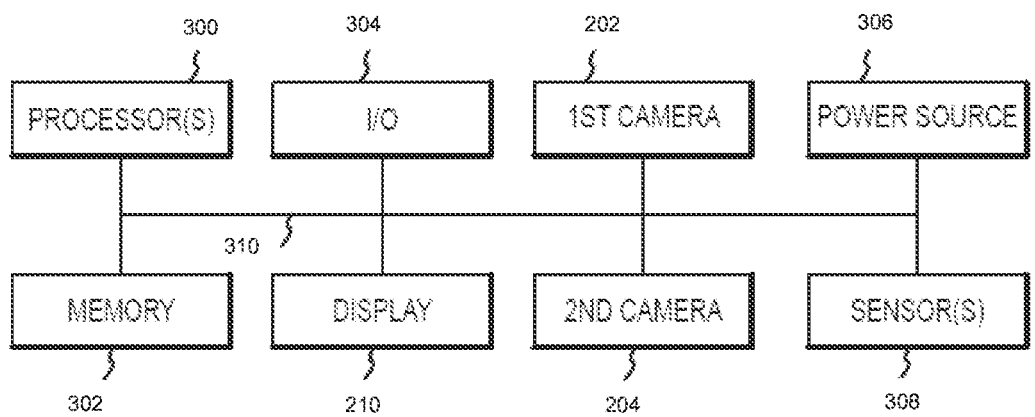
FIG. 3 illustrates a simplified block diagram of the electronic device of FIG. 2.

The electronic device 200 can also include a number of internal components. FIG. 3 illustrates one example of a simplified block diagram of the electronic device 200. The electronic device can include one or more processors 300, storage or memory components 302, input/output interface 304, power source 306, and sensors 308, each of which will be discussed in turn below.

The one or more processors 300 can control some or all of the operations of the electronic device 200. The processor(s) 300 can communicate, either directly or indirectly, with substantially all of the components of the electronic device 200. For example, one or more system buses 310 or other communication mechanisms can provide communication between the processor(s) 300, the cameras 202, 204, the display 210, the one or more I/O devices 208, and/or the one or more sensors 308. The processor(s) 300 can be implemented as any electronic device capable of processing, receiving, or transmitting data or instructions. For example, the one or more processors 300 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 302 can store electronic data that can be used by the electronic device 200. For example, the memory 302 can store electrical data or content such as, for example, audio files, document files, timing signals, and image data. The memory 302 can be configured as any type of memory. By way of example only, memory 302 can be implemented as random access memory, read-only memory, Flash memory, removable memory, or other types of storage elements, in any combination.

The input/output interface 304 can receive data from a user or one or more other electronic devices. Additionally, the input/output interface 304 can facilitate transmission of data to a user or to other electronic devices. For example, in embodiments where the electronic device 200 is a smart telephone, the input/output interface 304 can receive data from a network or send and transmit electronic signals via a wireless or wired connection. Examples of wireless and wired connections include, but are not limited to, cellular, WiFi, Bluetooth, and Ethernet. In one or more embodiments, the input/output interface 304 supports multiple network or communication mechanisms. For example, the input/output interface 304 can pair with another device over a Bluetooth network to transfer signals to the other device while simultaneously receiving signals from a WiFi or other wired or wireless connection.

The one or more power sources 306 can be implemented with any device capable of providing energy to the electronic device 200. For example, the power source 306 can be a battery. Additionally or alternatively, the power source can be a wall outlet that the electronic device connects to with a power cord. Additionally or alternatively, the power source can be another electronic device that the electronic device 200 connects to with a connection cable, such as a Universal Serial Bus (USB) cable.

The one or more sensors 308 can by implemented with any type of sensor. Example sensors include, but are not limited to, an audio sensor (e.g., microphones), a light sensor (e.g., ambient light sensors), gyroscope(s), accelerometer(s), and a biometric sensor. The one or more sensors 308 can be used to provide data to the processor 300, which may be used to enhance or vary functions of the electronic device.

Figure 4:
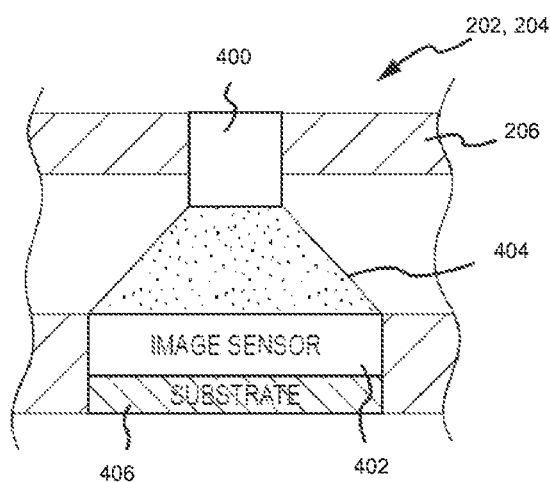
FIG. 4 depicts a cross-section view of the electronic device of FIG. 2A taken along line 4-4 in FIG. 2A.

As described with reference to FIGS. 2A and 2B, the electronic device 200 includes one or more cameras 202, 204 and an optional flash 212 or light source for the camera or cameras. FIG. 4 is a simplified cross-section view of the camera 202 taken along line 4-4 in FIG. 2A. Although FIG. 4 illustrates the first camera 202, those skilled in the art will recognize that the second camera 204 can be substantially similar to the first camera 202. In some embodiments, one camera may include a global shutter configured image sensor and one camera can include a rolling shutter configured image sensor. In other examples, one camera can include an image sensor with a higher resolution than the image sensor in the other camera, or the image sensors can be configured as two different types of image sensors (e.g., CMOS and CCD).

The camera 202 includes an imaging stage 400 that is in optical communication with an image sensor 402. The imaging stage 400 is operably connected to the enclosure 206 and positioned in front of the image sensor 402. The imaging stage 400 can include conventional elements such as a lens, a filter, an iris, and a shutter. The imaging stage 400 directs, focuses, or transmits light 404 within its field of view onto the image sensor 402. The image sensor 402 captures one or more images of a subject scene by converting the incident light into electrical signals.

The image sensor 402 is supported by a support structure 406. The support structure 406 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of the imaging stage 400 or the image sensor 402 can be controlled by timing signals or other signals supplied from a processor or memory, such as processor 300 in FIG. 3. Some or all of the elements in the imaging stage 400 can be integrated into a single component. Additionally, some or all of the elements in the imaging stage 400 can be integrated with the image sensor 402, and possibly one or more additional elements of the electronic device 200, to form a camera module. For example, a processor or a memory may be integrated with the image sensor 402 in some embodiments.

Figure 5:
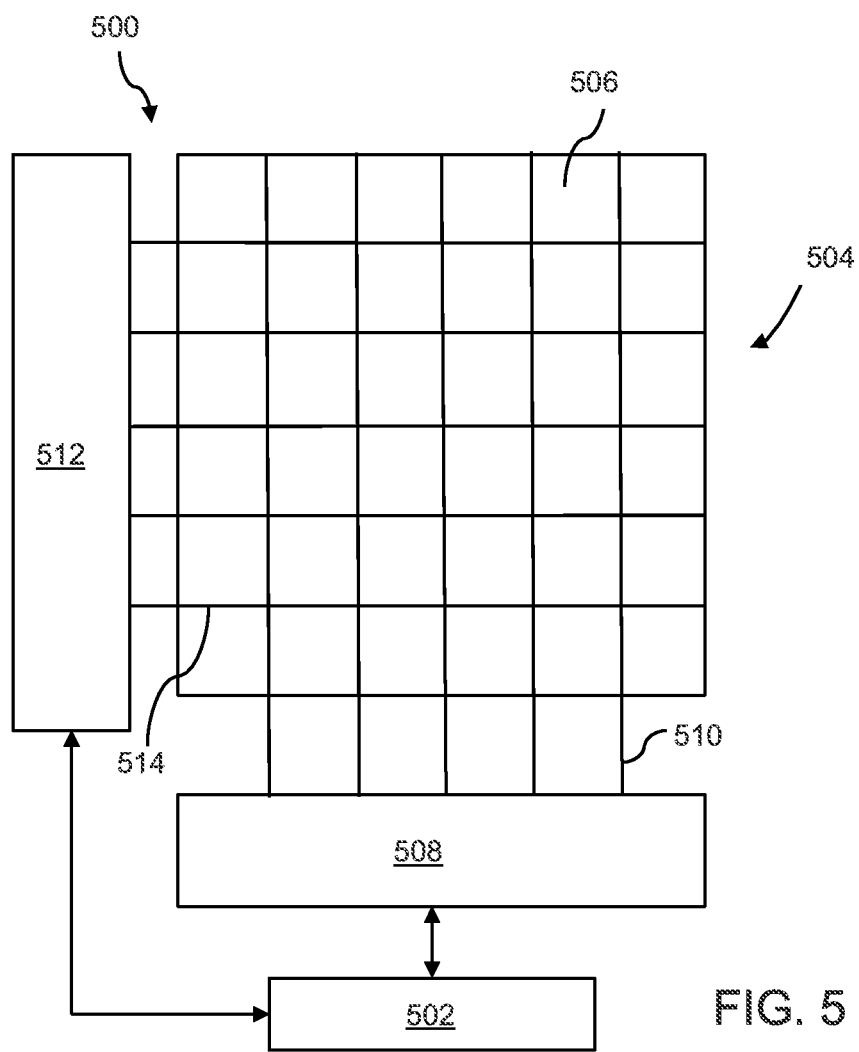
FIG. 5 illustrates a simplified block diagram of one example of an image sensor that is suitable for use as image sensor 402.

Referring now to FIG. 5, there is shown a top view of one example of an image sensor suitable for use as image sensor 402 shown in FIG. 4. The illustrated image sensor is a complementary metal-oxide semiconductor (CMOS) image sensor. The image sensor 500 can include an image processor 502 and an imaging area 504. The imaging area 504 can be implemented as a pixel array that includes pixels 506. In the illustrated embodiment, the pixel array is configured in a row and column arrangement. However, other embodiments are not limited to this configuration. The pixels in a pixel array can be arranged in any suitable configuration, such as, for example, a hexagon configuration.

The imaging area 504 may be in communication with a column select 508 through one or more column select or output lines 510. The imaging area 504 can also be in communication with a row select 512 through one or more row select lines 514. The row select 512 selectively activates a particular pixel 506 or group of pixels, such as all of the pixels 506 in a certain row. The column select 508 selectively receives the data output from the selec pixels 506 or groups of pixels (e.g., all of the pixels in the selected row).

The row select 512 and/or the column select 508 may be in communication with the image processor 502. The image processor 502 can provide signals to the row select 512 and the column select 508 to transfer charge and readout the signals representing the amount of charge from the photodetectors (not shown) in the pixels 506. The image processor 502 can process data from the pixels 506 and provide that data to the processor 300 and/or other components of the electronic device 200. It should be noted that in some embodiments, the image processor 502 can be incorporated into the processor 300 or separate therefrom.

Figure 6:
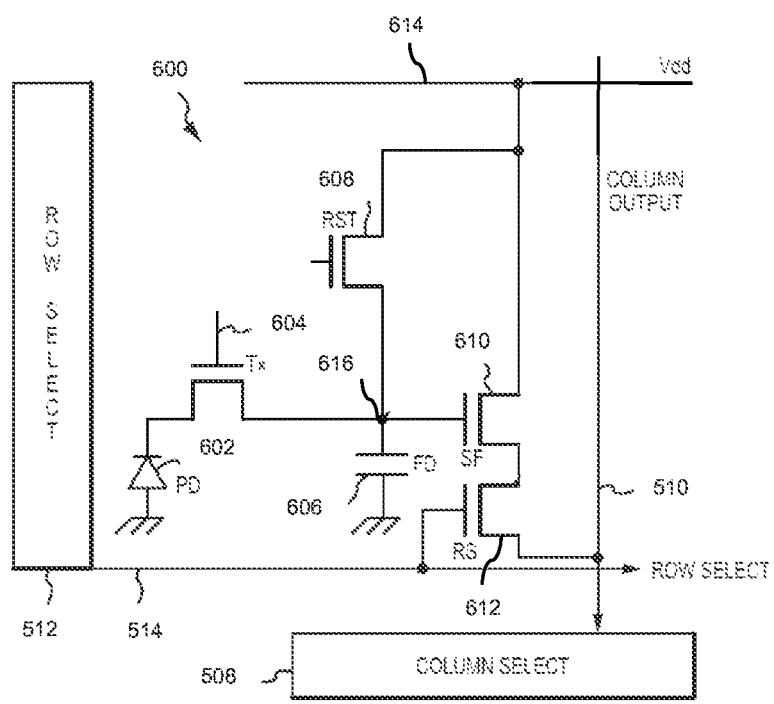
FIG. 6 depicts a simplified schematic view of a pixel suitable for use in an image sensor.

Referring now to FIG. 6, there is shown a simplified schematic view of a pixel that is suitable for use as pixels 506 shown in FIG. 5. The pixel 600 includes a photodetector (PD) 602, a transfer transistor (TX) 604, a sense region 606, a reset (RST) transistor 608, a readout (SF) transistor 610, and a row select (RS) transistor 612. The sense region 606 is represented as a capacitor in the illustrated embodiment because the sense region 606 can temporarily store charge received from the photodetector 602. As described below, after charge is transferred from the photodetector 602, the charge can be stored in the sense region 606 until the gate of the reset transistor 608 is pulsed to reset the voltage on the sense region. The charge in the sense region 606 is read out when the gate of the row select transistor 612 is pulsed.

One terminal of the transfer transistor 604 is connected to the photodetector 602 while the other terminal is connected to the sense region 606. One terminal of the reset transistor 608 and one terminal of the readout transistor 610 are connected to a supply voltage (Vdd) 614. The other terminal of the reset transistor 608 is connected to the sense region 606, while the other terminal of the readout transistor 610 is connected to a terminal of the row select transistor 612. The other terminal of the row select transistor 612 is connected to an output line 510.

By way of example only, in one embodiment the photodetector 602 is implemented as a photodiode (PD) or pinned photodiode, the sense region 606 as a floating diffusion (FD), and the readout transistor 610 as a source follower transistor (SF). The photodetector 602 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 600 can be implemented with additional or different components in other embodiments. For example, a row select transistor can be omitted and a pulsed power supply mode used to select the pixel, the sense region can be shared by multiple photodetectors and transfer transistors, or the reset and readout transistors can be shared by multiple photodetectors, transfer gates, and sense regions.

When an image is to be captured, an integration period for the pixel begins and the photodetector 602 accumulates photo-generated charge in response to incident light. When the integration period ends, the accumulated charge in the photodetector 602 is transferred to the sense region 606 by selectively pulsing the gate of the transfer transistor 604. Typically, the reset transistor 608 is used to reset the voltage on the sense region 606 (node 616) to a predetermined level prior to the transfer of charge from the photodetector 602 to the sense region 606. When charge is to be readout of the pixel, the gate of the row select transistor is pulsed through the row select 512 and row select line 514 to select the pixel (or row of pixels) for readout. The readout transistor 610 senses the voltage on the sense region 606 and the row select transistor 512 transmits the voltage to the output line 510.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

Figure 7:
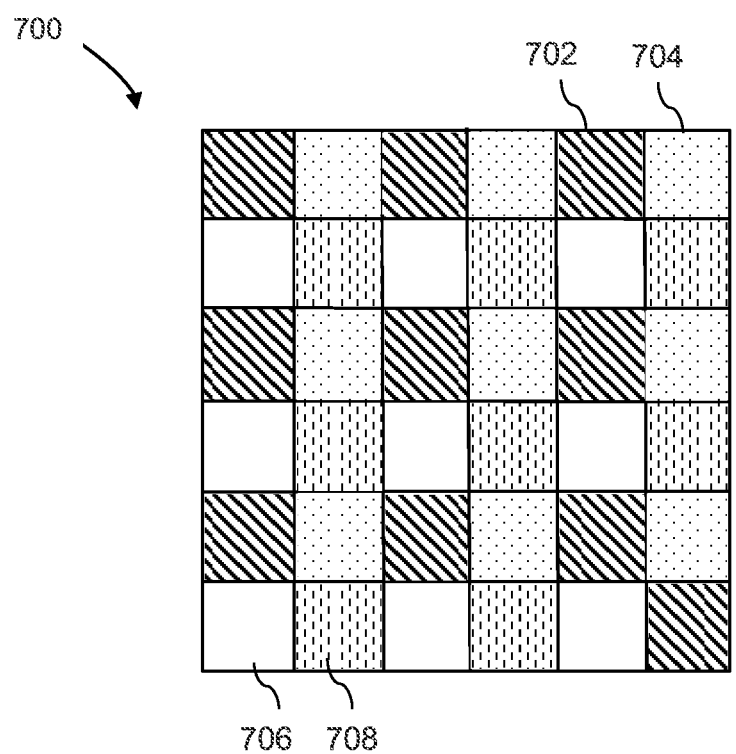
FIG. 7 illustrates one example of a color filter array suitable for use with an image sensor.

In general, photodetectors detect light with little or no wavelength specificity, making it difficult to identify or separate colors. When color separation is desired, a color filter array can be disposed over the pixel array to filter the wavelengths of light sensed by the photodetectors in the pixel array. A color filter array is a mosaic of filter elements with each filter element typically disposed over a respective pixel. A filter element restricts the wavelengths of light detected by a photodetector, which permits color information in a captured image to be separated and identified. FIG. 7 illustrates one example of a color filter array suitable for use with an image sensor in an embodiment. The color filter array (CFA) 700 includes filter elements 702, 704, 706, 708. Although only a limited number of filter elements are shown, those skilled in the art will recognize that a CFA can include thousands or millions of filter elements.

In one embodiment, each filter element restricts light wavelengths. In another embodiment, some of the filter elements filter light wavelengths while other filter elements are panchromatic. A panchromatic filter element can have a wider spectral sensitivity than the spectral sensitivities of the other filter elements in the CFA. For example, a panchromatic filter element can have a high sensitivity across the entire visible spectrum. A panchromatic filter element can be implemented, for example, as a neutral density filter or a color filter. Panchromatic filter elements can be suitable in low level lighting conditions, where the low level lighting conditions can be the result of low scene lighting, short exposure time, small aperture, or other situations where light is restricted from reaching the image sensor.

Figure 8:
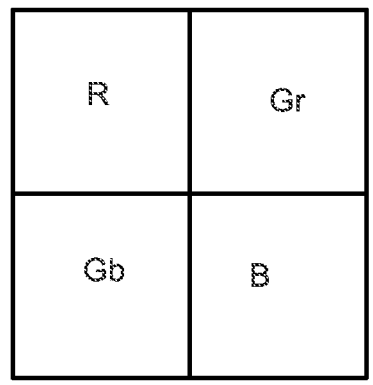
FIG. 8 depicts a Bayer color filter array pattern.

Color filter arrays can be configured in a number of different mosaics. The color filter array 700 can be implemented as a red (R), green (G), and blue (B) color filter array or a cyan (C), magenta (M), yellow (Y) color filter array. The Bayer pattern is a well know color filter array pattern. The Bayer color filter array filters light in the red (R), green (G), and blue (B) wavelengths ranges (see FIG. 8). The Bayer color filter pattern includes two green color filter elements (Gr and Gb), one red color filter element (R), and one blue color filter element (B). The group of four filter elements is tiled or repeated over the pixels in a pixel array to form the color filter array.

Figure 9:
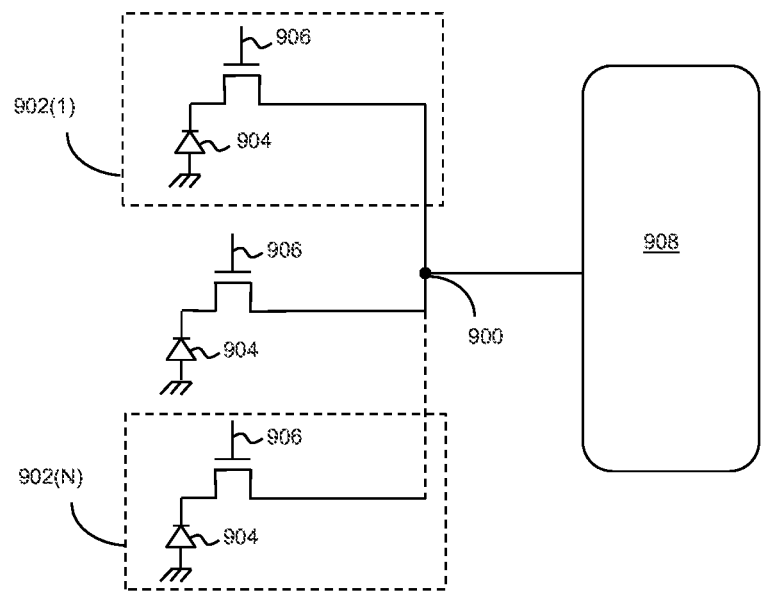
FIG. 9 depicts one example of a shared pixel architecture.

The accumulated charge or signal can be read out of each pixel individually, read out of groups of two or more pixels, or read out of all of the pixels simultaneously depending on the construction of the pixel array and the associated readout circuitry. In some embodiments, each individual pixel is connected to read out circuitry, while in other embodiments two or more pixels are operatively connected to and share the readout circuitry. FIG. 9 depicts one example of a shared pixel architecture. In the illustrated embodiment, N number of pixels are connected to a shared common node 900. The common node 900 is a sense region in some embodiments. The number N can be any number greater than two. For example, two, three, four, or six pixels can be connected to the common node 900.

Each pixel 902 includes a photodetector 904 and a transfer transistor 906 connected between the photodetector 904 and the common node 900. Readout circuitry 908 can be connected to the common node 900. Since the readout circuitry 908 is connected to the common node 900, the pixels share the readout circuitry 908. By way of example only, the readout circuitry 908 can include a sense region, a reset transistor, and a readout transistor that can be configured as shown in FIG. 6. The sense region, the reset transistor and the readout transistor can be connected to the common node 900. A row select transistor can be connected to the readout transistor.

The gates of each transfer transistor 906 can be selectively pulsed in one embodiment, allowing charge from one photodetector 904 to transfer to the common node 900. Since each transfer transistor 906 can be selectively pulsed, the charge from a single pixel or from multiple pixels can be transferred separately or simultaneously to the common node 900. Thus, the accumulated charge in any number of pixels (e.g., two or four pixels) can be binned or summed together by transferring the charge to the common node, either separately or simultaneously, before the readout circuitry 908 reads the charge from the common node 900. The summed charge can then be readout using some or all of the components in the readout circuitry 908.

Some embodiments can configure the pixel and/or the sharing configuration differently. As one example, for Global Shutter (GS) pixel, a storage region and second transfer gate can be included in each pixel. Charge is acquired simultaneously in all pixels, then globally transferred to storage regions, and stored on the storage node before readout. During readout, the charge is transferred to the shared sense region and pixel operated similar to described above.

Figure 10:
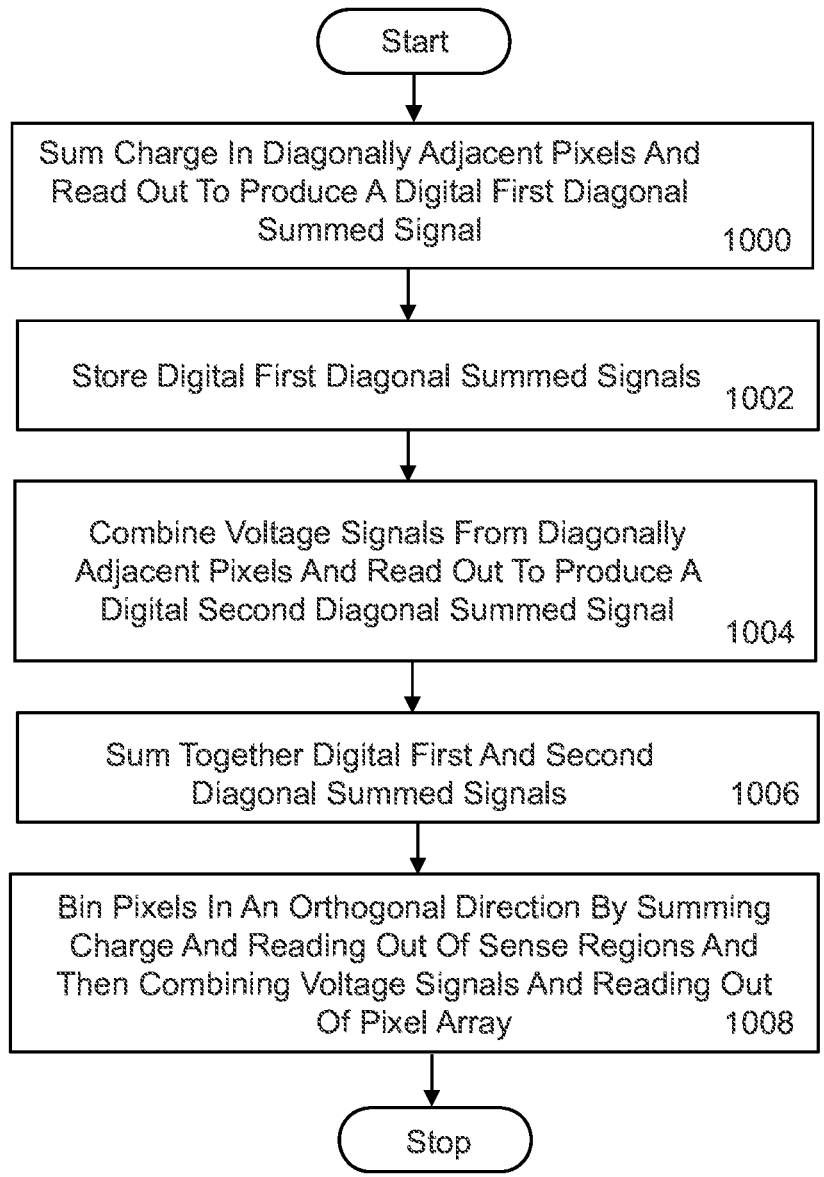
FIG. 10 is a flowchart of an example method for pixel binning.

Charge summing can occur in the same color plane or in multiple color planes. FIG. 10 is a flowchart of an example method for pixel binning. Initially, as shown in block 1000, charge in multiple pixels can be summed along a diagonal direction and read out to produce a digital first diagonal summed signal. The charge may be summed together by transferring the charge from the photodetectors to a shared sense region before reading the charge out of the sense region. In one embodiment, the pixels are adjacent to each other in the pixel array (e.g., adjacent rows or columns). In other embodiments, the pixels are not adjacent to each other. The pixels can be arranged in lines, such as in rows or columns, can abut each other, can be located near each other, and/or are situated in the pixel array.

The first diagonal summed signal may then be stored in memory, such as memory 302 in FIG. 3 (block 1002). Next, as shown in block 1004 of FIG. 10, pixels signals from pixels along a diagonal direction can be combined and read out to produce a digital second diagonal summed signal. In one embodiment, the pixels signals are voltage signals that are combined by electrically connecting output lines together and reading charge out of the pixels onto the connected output lines. Thus, the voltage signals representing the amount of charge in the pixels are combined. When the signals are nearly the same, the signals are averaged together by reading the signals onto the connected output lines.

In some embodiments, the pixel signals are from pixels that are positioned along the same first diagonal direction as in block 1000. Again, the pixels are adjacent to each other in the pixel array (e.g., adjacent rows or columns) in one embodiment. In other embodiments, the pixels are not adjacent to each other.

The digital first and second diagonal summed signals are then combined, as shown in block 1006. Orthogonal binning can be performed on other pixels in the pixel array by summing charge on respective common sense regions and then then combining the voltage signals that represent the summed charge on respective output lines (block 1008). The charge can be summed by transferring charge from the photodetectors to a common sense region prior to reading the charge out of the sense region.

Figure 11:
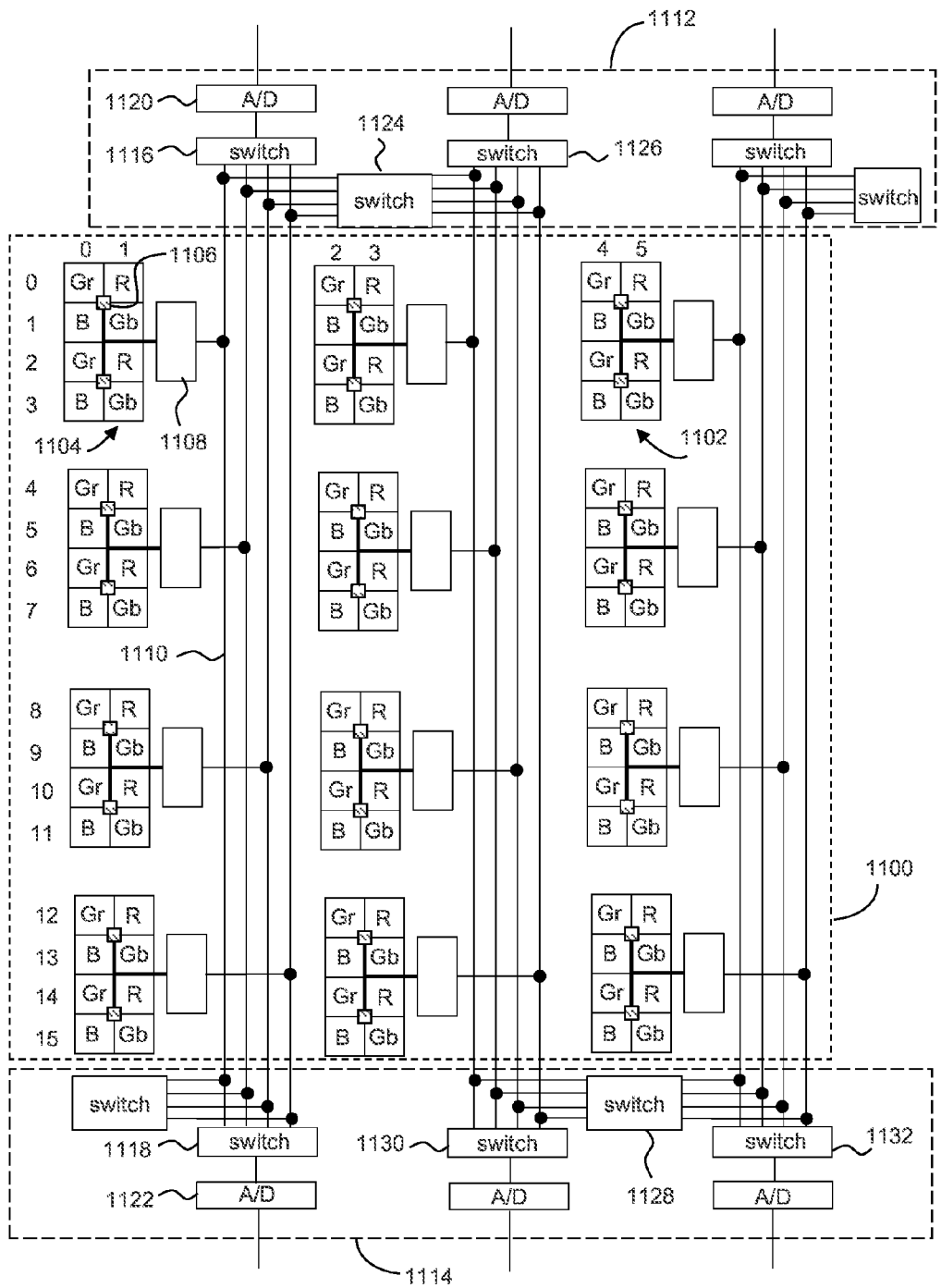
FIG. 11 is a simplified schematic diagram of an image sensor suitable for performing the method of FIG. 10.

Referring now to FIG. 11, there is shown a simplified schematic diagram of an image sensor suitable for performing the method of FIG. 10. The sensor architecture includes a 2×4 sharing configuration. The pixels in the pixel array 1100 are divided into groups 1102 of eight pixels (i.e., two columns and four rows of pixels in each group). Other embodiments can have a different number of pixels in each group. Each group 1102 of pixels and the associated readout circuitry is shown as a discrete group in FIG. 11 for ease of understanding. Although not required, typically the pixels in a pixel array are substantially contiguous across the pixel array. For simplicity, the construction and connections for only one group of pixels will be described. Those skilled in the art will recognize that the other groups of pixels and constructed and configured as the described group.

The pixels in a group 1104 share a common sense region 1106. The common sense region 1106 is operably connected to readout circuitry 1108. The readout circuitry is operably connected to an output line 1110. Multiple output lines are grouped together and connected to a column select 1112, 1114. More particularly, one group of output lines is operably connected to a first vertical switch 1116 and a second vertical switch 1118. The first vertical switch 1116 is operably connected to a first analog-to-digital converter 1120. The second vertical switch 1118 is operably connected to a second analog-to-digital converter 1122.

A first horizontal switch 1124 is configured to connect a selected output line in the one group of output lines to a selected output line in another group of output lines. For example, the first horizontal switch 1124 connects an output line operably connected to the first vertical switch 1116 (e.g., output line 1110) to an output line connected to a third vertical switch 1126. Similarly, a second horizontal switch 1128 connects an output line operably connected to the fourth vertical switch 1130 to an output line connected to a fifth vertical switch 1132. Additionally or alternatively, the horizontal switches can connect output lines in the same group of output lines together.

In some embodiments, the readout circuitry includes a reset transistor and a readout transistor that can be configured as shown in FIG. 6. The reset transistor and the readout transistor can be connected to the common sense region 1106. A row select transistor can be connected to the readout transistor. Additionally, the vertical and horizontal switches may be configured as multiplexers in one or more embodiments. Different types of switches and/or readout circuitry can be used in other embodiments.

Figure 12:
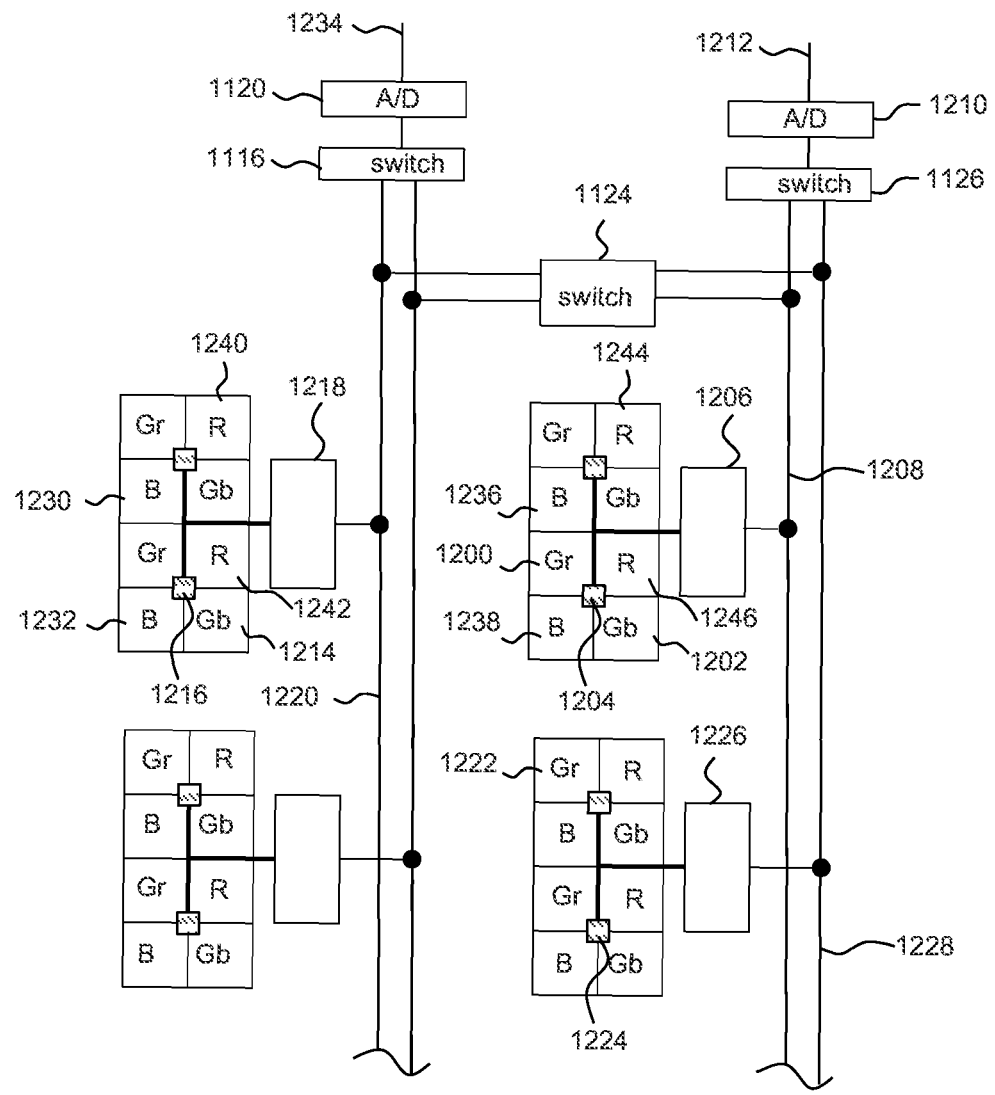
FIG. 12 illustrates an expanded view of a portion of the image sensor shown in FIG. 11.

The method of FIG. 10 will be illustrated using FIG. 12. FIG. 12 is an expanded view of a portion of the image sensor shown in FIG. 11. Again, for simplicity, a binning operation for only three 2×2 clusters will be described. Those skilled in the art will appreciate that the same binning operation can be performed on all of the pixels in the pixel array.

In the illustrated embodiment, the pixels binned diagonally are associated with the two green color planes in the Bayer CFA. As described earlier, charge in multiple pixels can be summed along a diagonal direction (or directions) and read out of the pixel array to produce a first diagonal summed signal. In the illustrated embodiment, charge in the green pixels 1200 and 1202 is summed by transferring the charge to the common sense region 1204. The summed charge is associated with two different color planes; the Gr color plane and the Gb color plane. The charge can be transferred simultaneously or sequentially to the common sense region 1204 before the common sense region 1204 is read out.

The summed charge is read out of the common sense region 1204 using the readout circuitry 1206. A voltage signal representing the amount of summed green charge is output onto output line 1208. The third vertical switch 1126 selects the output line 1208 and operably connects the output line to the analog-to-digital converter 1210. The voltage signal on the output line 1208 is converted to a digital signal to produce the digital first diagonal summed signal on signal line 1212.

Next, the charge in pixel 1214 is transferred to the common sense region 1216 and the readout circuitry 1218 reads the charge out of the sense region 1216. A voltage signal representing the amount of charge in pixel 1214 is received by the output line 1220. Similarly, the charge in pixel 1222 is transferred to the common sense region 1224 and the readout circuitry 1226 reads the charge out of the sense region 1224. A voltage signal representing the amount of charge in pixel 1222 is output onto the output line 1228.

The first horizontal switch 1124 connects the output lines 1220 and 1228 together to combine the voltage signals on the output lines 1220 and 1228. A vertical switch (e.g.,third vertical switch 1126) can select a connected output line (e.g., output line 1228) and connect the connected output lines 1220, 1228 to an analog-to-digital converter (e.g., A/D 1210) and the digital second diagonally summed signal is output on signal line 1212. The digital first and second diagonally summed signals can subsequently be combined to produce a binned 2×2 cluster.

Thus, the first diagonally summed signal is created by summing charge on a common sense region and reading the summed charge out of the pixel array (e.g., pixel array 1100 in FIG. 11). The second diagonally summed signal is formed by combining voltage signals and reading the combined voltage signals out of the pixel array. In the illustrated embodiment, the first and second diagonally summed signals represent light associated with two different color planes (e.g., Gr and Gb).

Pixels can also be binned orthogonally. In the illustrated embodiment, the blue and red pixels are binned orthogonally. For example, charge in the blue pixels 1230 and 1232 can be transferred to the common sense region 1216 to sum the charge in the two pixels together. The readout circuitry 1218 can read the summed charge out of the common sense region 1216 and a voltage signal representing the amount of summed blue charge can be received by the output line 1220. The voltage signal represents a first orthogonal summed signal. The first vertical switch 1116 can select the output line 1220 and the A/D converter 1120 can convert the voltage signal to a digital signal to produce a first digital orthogonal summed signal. The first digital orthogonal summed signal is output on signal line 1234.

At substantially the same time, charge in the blue pixels 1236 and 1238 can be transferred to the common sense region 1204 to sum the charge in the two pixels together. The readout circuitry 1206 can read the summed charge out of the common sense region 1204 and a voltage signal representing the amount of summed blue charge can be received by the output line 1208. The voltage signal represents a second orthogonal summed signal. The third vertical switch 1126 can select the output line 1208 and the A/D converter 1210 can convert the voltage signal to a digital signal to produce a second digital orthogonal summed signal. The digital first and second orthogonal summed signals can then be combined to produce a binned 2×2 cluster.

Next, charge in the red pixels 1240 and 1242 can be transferred to the common sense region 1216 to sum the charge in the two pixels together. The readout circuitry 1218 can read the summed charge out of the common sense region 1216 and a voltage signal representing the amount of summed red charge can be received by the output line 1220. The voltage signal represents a third orthogonal summed signal.

At substantially the same time, charge in the red pixels 1244 and 1246 can be transferred to the common sense region 1204 to sum the charge in the two pixels together. The readout circuitry 1206 can read the summed charge out of the common sense region 1204 and a voltage signal representing the amount of summed red charge can be received by the output line 1208. The voltage signal represents a fourth orthogonal summed signal. The first horizontal switch 1124 may then connect the output lines 1208 and 1220 together and a vertical switch (e.g., third vertical switch 1126) can connect the connected output lines to the A/D converter 1210. The A/D converter 1210 can convert the combined third and fourth voltage signals to a digital signal to produce a digital orthogonal summed signal. The digital orthogonal summed signal is output on signal line 1212.

Since different halves of the 2×2 green pixel clusters are binned in different pixel readout cycles, the signals representing the binned 2×1 green pixel clusters can be stored in memory until the signals representing the other halves of the 2×2 cluster are read out. As described earlier, when the signals representing the other halves of the 2×2 clusters are read out, the 2×1 halves can be combined digitally to complete the binning operation on the 2×2 green pixel clusters. An image may then be constructed using at least some of the digital signal representing the 2×2 green pixel clusters. At least some of the digital signals representing the orthogonally summed red and blue pixels can also be used to create the image.

Additionally, in the FIGS. 11 and 12 embodiments, three transfer signal lines for the transfer transistors in each row of pixels can be included in the image sensor. One transfer signal line is operatively connected to the transfer transistors of the red or blue pixels in a row. The other two transfer signal lines are alternately connected to the transfer transistors in the green pixels in the row. One of the two transfer signal lines is operatively connected to the transfer transistors in the green pixels in every other column (e.g., the odd columns) and the other transfer signal line is connected to the remaining transfer transistors in the same row (e.g., the green pixels in the even columns).

Other embodiments can perform pixel binning differently. For example, the green, blue, and/or red pixels that are combined can be located in groups different from the groups shown in FIG. 12.

In one example, a binning operation can be performed as now described in conjunction with FIG. 11. In a first readout cycle, the green pixels located at these row and column positions can be summed on respective common sense regions: (0,0) and (1,1); (2,2) and (3,3); and (4,0) and (5,1). In a second readout cycle, the green pixels located at these row and column positions can be combined on the output lines: (1,3) and (2,4); (1,7) and (2,8); and (5,3) and (6,4) (note that columns 6-8 are not shown in FIG. 11). In a third readout cycle, the green pixels located at these row and column positions can be summed on respective common sense regions: (0,8) and (1,9); (2,10) and (3,11); and (4,8) and (5,9). In a fourth readout cycle, the green pixels located at these row and column positions can be combined on the output lines: (3,1) and (4,2); (3,5) and (4,6); and (7,1) and (8,2) (note that columns 7-11 are not shown in FIG. 11).

For orthogonal binning, in one readout cycle the blue and red pixels can be summed on respective common sense regions and the voltage signals representing the summed charges are then combined on respective output lines. For example, charge in the blue pixels located at these row and column positions can be summed on respective sense regions: (1,0) and(3,0); (1,2) and (3,2); (1,4) and (3,4); (1,6) and (3,6); (9,0) and (11,0); (9,2) and (11,2); (9,4) and (11,4); and (9,6) and 11,6) (note that column 6 is not shown in FIG. 11). The summed charge is read out of the sense regions and the voltage signals representing the summed charge may be combined on respective output lines as follows [voltage signals in [ ] brackets]: [(1,0)+(3,0)] combined with [(1,2)+(3,2)]; [(1,4)+(3,4)] combined with [(1,6)+(3,6)]; [(9,0)+(11,0)] combined with [(9,2)+(11,2)]; and [(9,4)+(11,4)] combined with [(9,6)+(11,6)].

Similarly, during the same readout cycle the red pixels located at these row and column positions can be summed on respective common sense regions as follows: (4,1) and (6,1); (4,3) and (6,3); (4,5) and (6,5); (4,7) and (6,7); (12,1) and (14,1); (12,3) and (14,3); (12,5) and (14,5); and (12,7)+(14,7) (note that column 7 is not shown in FIG. 11). The summed charge is read out of the sense regions and the voltage signals representing the summed charge may be combined on respective output lines as follows [voltage signals in [ ] brackets]: [(4,1)+(6,1)] combined with [(4,3)+(6,3)]; [(4,5)+(6,5)] combined with [(4,7)+(6,7)]; [(12,1)+(14,1)] combined with [(12,3)+(14,3)]; and [(12,5)+(14,5)] combined with [(12,7)+(14,7)] (note that column 7 is not shown in FIG. 11).

In another readout cycle for orthogonal binning the blue pixels located at these row and column positions can be summed on respective common sense regions as follows: (5,0) and (7,0); (5,2) and (7,2); (5,4) and (7,4); (5,6) and (7,6); (13,0) and (15,0); (13,2) and (15,2); (13,4) and (15,4);

and (13,6) and (15,6) (note that column 6 is not shown in FIG. 11). The summed charge is read out of the sense regions and the voltage signals representing the summed charge may be combined on respective output lines as follows [voltage signals in [ ] brackets]: [(5,0)+(7,0)] combined with [(5,2)+ (7,2)]; [(5,4)+(7,4)] combined with [(5,6)+(7,6)]; [(13,0)+ (15,0)] combined with [(13,2)+(15,2)]; and [(13,4)+(15,4)] combined with [(13,6)+(15,6)] (note that column 6 is not shown in FIG. 11).

Similarly, during the same readout cycle the red pixels located at these row and column positions can be summed on respective common sense regions as follows: (0,1) and (2,1); (0,3) and (2,3); (0,5) and (2,5); (0,7) and (2,7); (8,1) and (10,1); (8,3) and (10,3); (8,5) and (10,5); and (8,7) and (10,7) (note that column 7 is not shown in FIG. 11). The summed charge is read out of the sense regions and the voltage signals representing the summed charge may be combined on respective output lines as follows [voltage signals in [ ] brackets]: [(0,1)+(2,1)] combined with [(0,3)+ (2,3)]; [(0,5)+(2,5)] combined with [(0,7)+(2,7)]; [(8,1)+(10, 1)] combined with [(8,3)+(10,3)]; and [(8,5)+(10,5)] combined with [(8,7)+(10,7)] (note that column 7 is not shown in FIG. 11).

Figure 13:
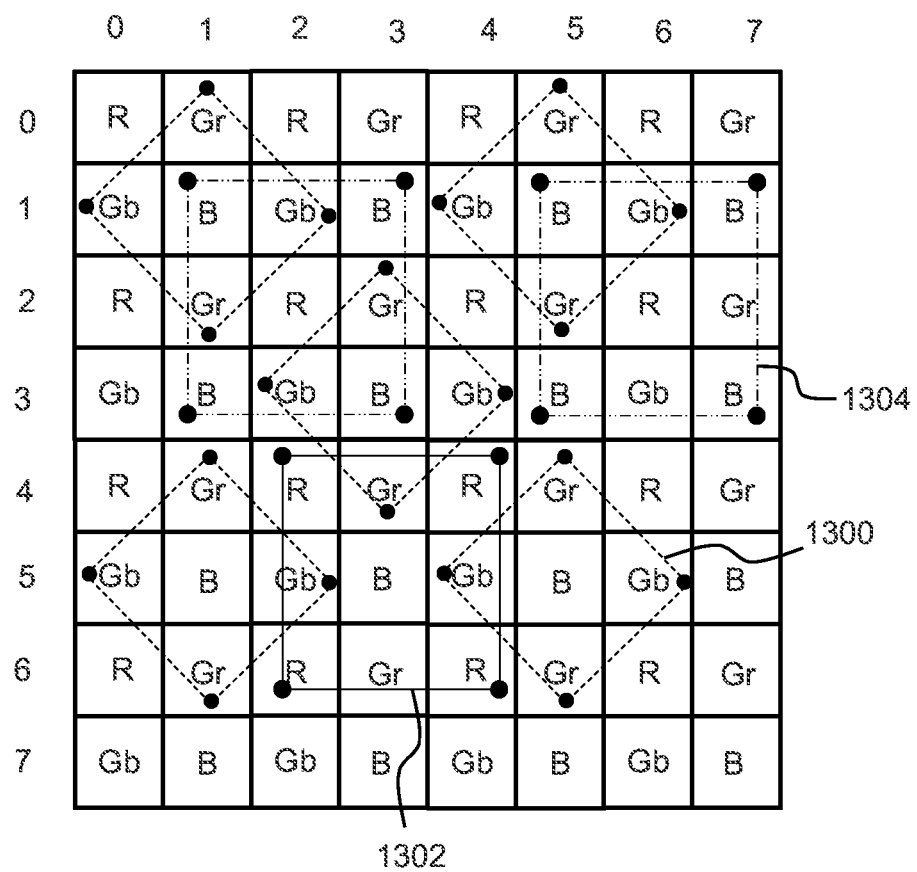
FIG. 13 depicts a Bayer color filter pattern and one example of 2×2 pixel binning.

Referring now to FIG. 13, there is shown a Bayer color filter pattern and one example of 2×2 pixel binning. In the illustrated embodiment, the binned pixels are in adjacent rows in the pixel array (although this is not required). Four green pixels 1300 are binned diagonally to form a diamond binning pattern. Clusters of four red pixels 1302 and four blue pixels 1304 are binned orthogonally to form a square shape. The binning pattern in FIG. 13 aligns the center of a blue pixel cluster 1304 with the center of the green diamond clusters 1300. In some embodiments, with additional processing the phase of the green diamond clusters 1300 can be changed so that the center of the green diamond clusters is aligned with the center of the red pixel clusters. In other embodiments, none of the green diamond clusters are aligned with the red or blue pixel clusters.

Figure 14:
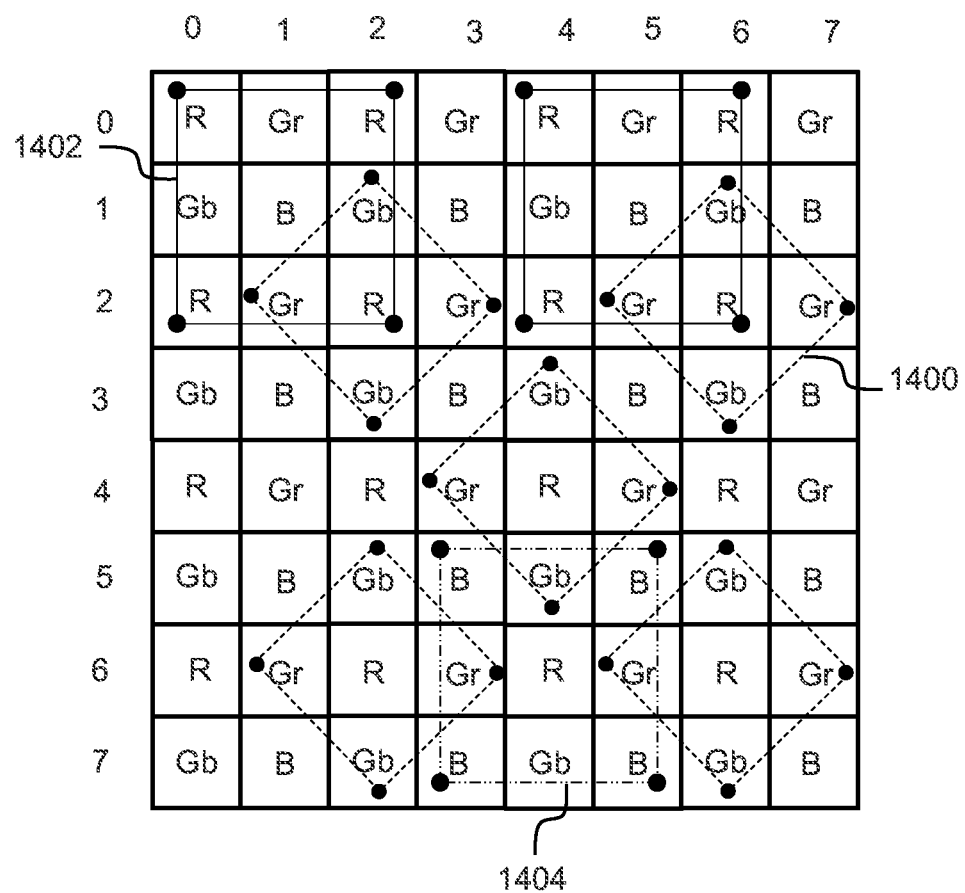
FIG. 14 illustrates the Bayer color filter pattern and another example of 2×2 pixel binning.

FIG. 14 illustrates a Bayer color filter pattern and another example of 2×2 pixel binning. Like the FIG. 13 embodiment, the binned pixels are in adjacent rows in the pixel array. Four green pixels 1400 are binned diagonally to form a diamond binning pattern. Clusters of four red pixels 1402 and four blue pixels 1404 are binned orthogonally to form a square shape. The binning pattern in FIG. 14 aligns the center of a red pixel cluster 1402 with the center of the green diamond clusters 1400. In some embodiments, with additional processing the phase of the green diamond clusters 1400 can be changed so that the center of the green diamond clusters is aligned with the center of the blue pixel clusters. In other embodiments, none of the green diamond clusters are aligned with the red or blue pixel clusters.

Figure 15:
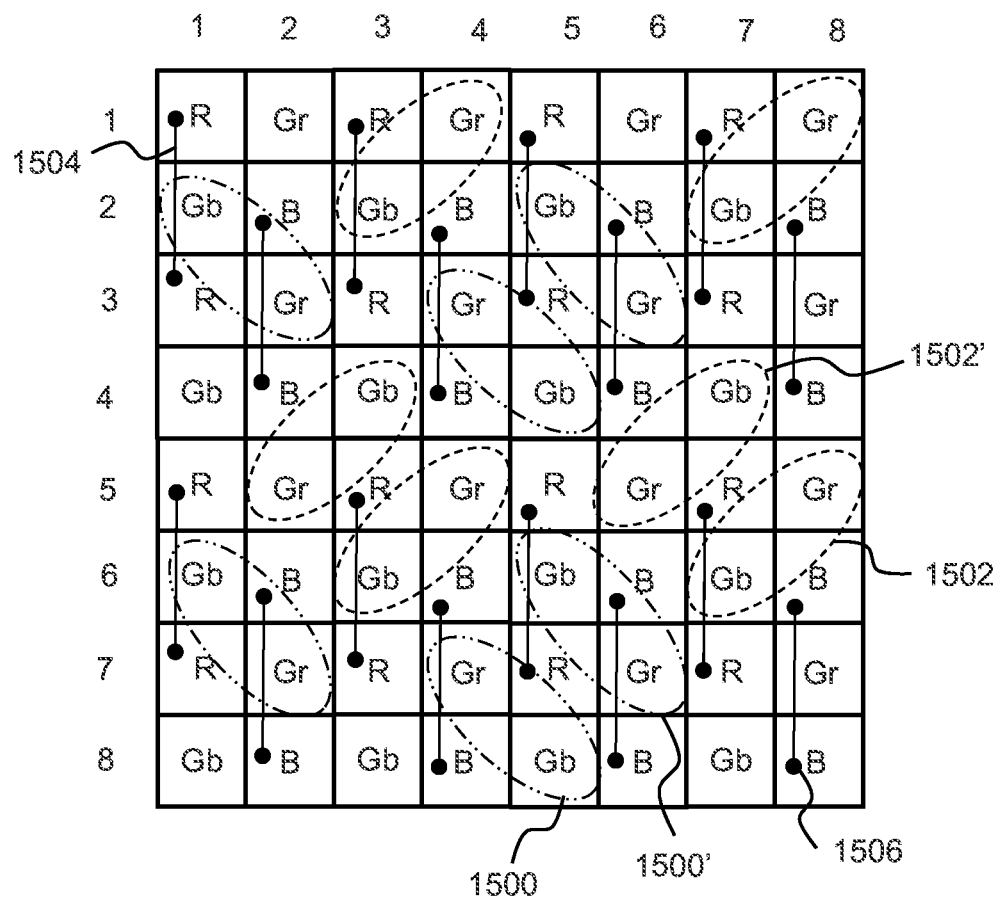
FIG. 15 depicts the Bayer color filter pattern and one example of 2×1 pixel binning.

The binning operation described herein can be used for 2×1 binning. FIG. 15 depicts the Bayer color filter pattern and one example of 2×1 pixel binning. Two green pixels 1500 (e.g., Gr and Gb) can be binned diagonally and the diagonal direction can alternate for every 2 clusters (see 1500, 1500' and 1502, 1502'). For example, in the illustrated embodiment charge in two green pixels (e.g., Gr and Gb 1500) can be summed on respective common sense regions and the summed charge read out of the pixel array. Charge may then be read out of other green pixels and the voltage signals representing the charge may then be combined on respective output lines (e.g., combine voltage signals from diagonally adjacent pixels such as the Gr and Gb pixels in 1500'). The combined voltage signals can then be read out of the pixel array. All four of the green pixels 1500, 1500' are diagonally adjacent along a first diagonal direction in the pixel array. Note that the 2×1 binning operation performs the blocks 1000, 1002, and 1004 in FIG. 10, but does not perform block 1006.

Charge in two green pixels that are diagonally adjacent along a different second diagonal direction can then be summed on respective common sense regions and the summed charge read out of the pixel array (e.g., Gr and Gb 1502). Charge may then be read out of other green pixels that are diagonally adjacent along the second diagonal direction and the voltage signals representing the charge may then be combined on respective output lines (e.g., combine voltage signals from diagonally adjacent pixels Gr and Gb 1502'). The combined voltage signals can then be read out of the pixel array. Unlike the previous four green pixels, these four green pixels 1502, 1502' are diagonally adjacent along the second diagonal direction in the pixel array.

Clusters of two red pixels 1504 and clusters of two blue pixels 1506 can be binned orthogonally by summing the red charge on respective sense regions and by summing the blue charge on respective sense regions. The summed charge may then be read out of the pixel array. In a 2×1 binning operation, voltage signals representing the summed blue charge are not combined on the output lines, and voltage signals representing the summed red charge are not combined on the output lines.

An image may then be constructed using at least some of the diagonally summed green signals, the orthogonally summed red signals, and the orthogonally summed blue signals. Other embodiments may create an image using at least some of the signals that represent the 2×1 diagonally summed pixels.

Various embodiments have been described in detail with particular reference to certain features thereof, but it will be understood that variations and modifications can be effected within the spirit and scope of the disclosure. For example, embodiments described herein sum charge along different diagonal directions in 2×1 and 2×2 combinations. Other embodiments can sum charge along different diagonal directions in different combinations, such as, for example, a 3×3 combination. Additionally or alternatively, colors other than green can be summed diagonally.

And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for binning charge in an image sensor having a pixel array that includes a plurality of pixels, the method comprising:

producing a first diagonal summed signal by summing charge in two or more pixels positioned along a first diagonal direction and reading the summed charge out of the pixel array;

producing a second diagonal summed signal by combining voltage signals read out of two or more pixels positioned along the first diagonal direction and reading the combined voltage signals out of the pixel array;

combining the first and second diagonal summed signals together;

producing a first orthogonal summed charge by summing charge in two or more pixels positioned along a first orthogonal direction;

producing a second orthogonal summed charge by summing charge in two or more pixels positioned along the first orthogonal direction;

producing a combined orthogonal voltage signal by combining a first voltage signal that represents the first orthogonal summed charge and a second voltage signal that represents the second orthogonal summed charge; and reading the combined orthogonal voltage signal out of the pixel array.

2. The method as in claim 1, wherein the charge in the two or more pixels of the first diagonal summed signal comprises charge in a first color plane and the charge in the two or more pixels of the first and the second orthogonal summed charges comprises charge in at least one different second color plane.

3. The method as in claim 1, wherein the charge in the two or more pixels of the first diagonal summed signal comprises charge in different color planes.

4. The method as in claim 3, wherein the different color planes comprise green color planes associated with a Bayer color filter array.

5. The method as in claim 1, wherein the charge in at least one of the two or more pixels of the first diagonal summed signal comprises charge associated with a panchromatic filter element.

6. The method as in claim 1, wherein at least one voltage signal read out of the two or more pixels comprises a signal representing charge read out of a pixel associated with a panchromatic filter element.

7. The method as in claim 1, further comprising:
prior to combining the first and second diagonal summed signals, converting the first and second diagonal summed signals into digital first and second diagonal summed signals; and
combining the digital first and second diagonal summed signals together.

8. The method as in claim 7, further comprising constructing an image using the combined digital first and second diagonal summed signals.

9. The method as in claim 1, wherein summing charge in the two or more pixels positioned along the first diagonal direction comprises summing charge in two pixels positioned adjacently along the first diagonal direction.

10. The method as in claim 9, wherein summing charge in the two pixels positioned adjacently along the first diagonal direction comprises summing charge in two pixels in adjacent rows along the first diagonal direction.

11. The method as in claim 1, further comprising:
producing a third diagonal summed signal by summing charge in two or more pixels positioned along a different second diagonal direction and reading the summed charge out of the pixel array; and
producing a fourth diagonal summed signal by combining voltage signals read out of two or more pixels positioned along the second diagonal direction and reading the combined voltage signal out of the pixel array.

12. The method as in claim 11, further comprising constructing an image using the first, second, third, and fourth diagonal summed signals.

13. A method for binning charge in an image sensor, the image sensor including a plurality of pixels in a pixel array, the method comprising:
producing a first diagonal summed signal by summing charge in a first diagonally adjacent pixel pair and reading the summed charge out of the pixel array; and
producing a second diagonal summed signal by combining voltage signals output from a second diagonally adjacent pixel pair and reading the combined voltage signals out of the pixel array, wherein the first and second diagonally adjacent pixel pairs are diagonally adjacent along a first diagonal direction in the pixel array.

14. The method as in claim 13, wherein the charge in the first diagonally adjacent pixel pair comprises charge associated with a single color plane and the voltage signals in the second diagonally adjacent pixel pair comprise voltage signals associated with a single color plane.

15. The method as in claim 13, wherein the charge in the first diagonally adjacent pixel pair comprises charge associated with different color planes and the voltage signals in the second diagonally adjacent pixel pair comprise voltage signals associated with different color planes.

16. The method as in claim 15, wherein the different color planes comprise a first green color plane and a different second green color plane in a Bayer color filter array.

17. The method as in claim 13, wherein the charge in at least one of the first diagonally adjacent pixel pair comprises charge associated with a panchromatic filter element.

18. The method as in claim 13, wherein at least one voltage signal from the second diagonally adjacent pixel pair comprises a voltage signal representing charge read out of a pixel associated with a panchromatic filter element.

19. The method as in claim 13, further comprising:
converting the first and second diagonal summed signals into digital first and second diagonal summed signals; and
combining the digital first and second diagonal summed signals.

20. The method as in claim 19, further comprising:
summing charge in a first pixel pair in a first orthogonal direction to produce a first voltage signal;
summing charge in a second pixel pair in a second orthogonal direction to produce a second voltage signal; and
combining the first and the second voltage signals on an output line formed by electrically connecting two output lines together.

21. The method as in claim 20, further comprising:
converting the combined first and second voltage signals to a digital signal that represents the combined first and second voltage signals; and
constructing an image using the combined digital first and second diagonal summed signals and the digital signal representing the combined voltage signals.

22. The method as in claim 13, further comprising:
producing a third diagonal summed signal by summing charge in a third diagonally adjacent pixel pair and reading the summed charge out of the pixel array; and
producing a fourth diagonal summed signal by combining voltage signals output from a fourth diagonally adjacent pixel pair and reading the combined voltage signal out of the pixel array, wherein the third and fourth diagonally adjacent pixel pairs are diagonally adjacent along a different second diagonal direction in the pixel array.

23. The method as in claim 22, further comprising constructing an image using the first, second, third, and fourth diagonal summed signals.

24. An image capture device, comprising:
a plurality of pixels divided into groups of pixels with each group of pixels operably connected to a distinct sense region;
readout circuitry operably connected to each distinct sense region and to a distinct output line;

a first switch operably connected to a first set of output lines and to a second set of output lines; and a processing device operably connected to the plurality of pixels, wherein the processing device is adapted to selectively enable two or more pixels in a group to sum charge on a respective sense region and to enable a respective readout circuitry to read the summed charge out of the respective sense region;

wherein the processing device is adapted to:

selectively enable two or more pixels in two groups to transfer charge to respective sense regions;

enable the respective readout circuitry to read the charge out of the respective sense regions to produce voltage signals; and selectively enable the first switch to connect an output line in the first set of output lines and an output line in the second set of output lines together to combine the voltage signals.

25. The image capture device as in claim 24, further comprising:

second switches each operably connected to a respective set of output lines; and an analog-to-digital converter operably connected to each second switch.

* * * * *